Figure 1:
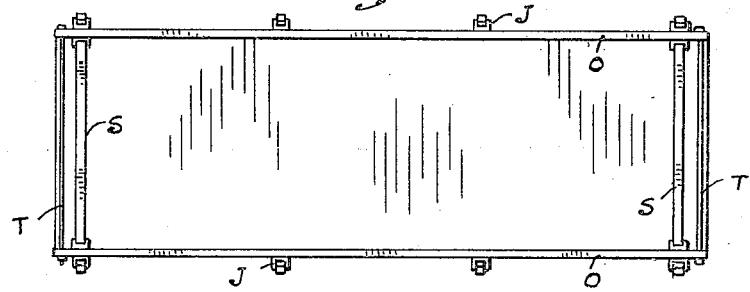

J. W. A. BIRD.
WAGON BODY.
APPLICATION FILED JAN. 20, 1909.

953,509.

Patented Mar. 29, 1910.

2 SHEETS—SHEET 1.

WITNESSES:
Ethel L. Lister
Clinton D. Murray

INVENTOR
JOHN W. A. BIRD.
BY Thomas L. Ryan
ATTORNEY

J. W. A. BIRD.
WAGON BODY.
APPLICATION FILED JAN. 20, 1909.
953,509.
Patented Mar. 29, 1910.
2 SHEETS—SHEET 2.
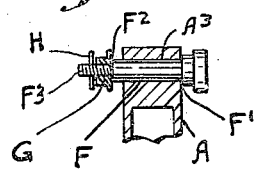
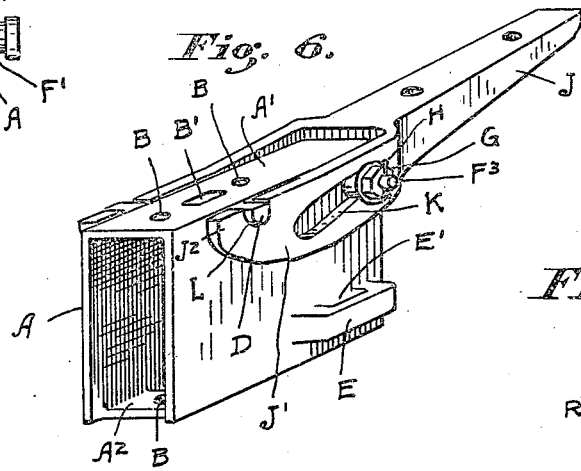
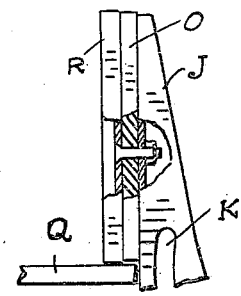
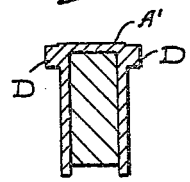
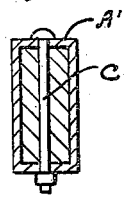
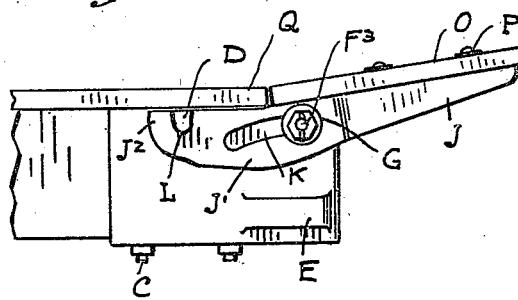
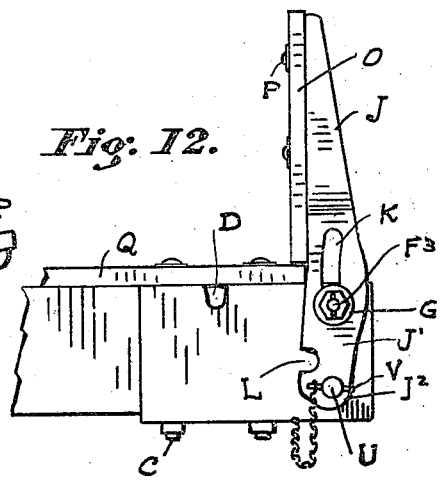
WITNESSES:
Ethel L. Lister
Clinton D. Murray
INVENTOR
JOHN W. A. BIRD.
BY
Thomas L. Ryan
ATTORNEY

UNITED STATES PATENT OFFICE.

JOHN W. A. BIRD, OF MUNCIE, INDIANA.

WAGON-BODY.

953,509.  Specification of Letters Patent.  Patented Mar. 29, 1910.

Application filed January 20, 1909. Serial No. 473,306.

*To all whom it may concern:*

Be it known that I, JOHN W. A. BIRD, a citizen of the United States, and a resident of the city of Muncie, in the county of Delaware, State of Indiana, have invented new and useful Improvements in Wagon-Bodies, of which invention I declare the following to be a specification.

This invention relates to improvements in wagon bodies and has for its principal object to provide a device whereby the ordinary box form of wagon body may be easily and quickly transformed into the platform type of bed.

Further and more specific objects are to provide a device of the kind referred to which may be easy of operation, easily applied to use, and which will be of simple construction, economical of manufacture, and durable.

Corresponding parts are indicated by similar characters throughout the several views in the drawings, in which—

Figure 2:
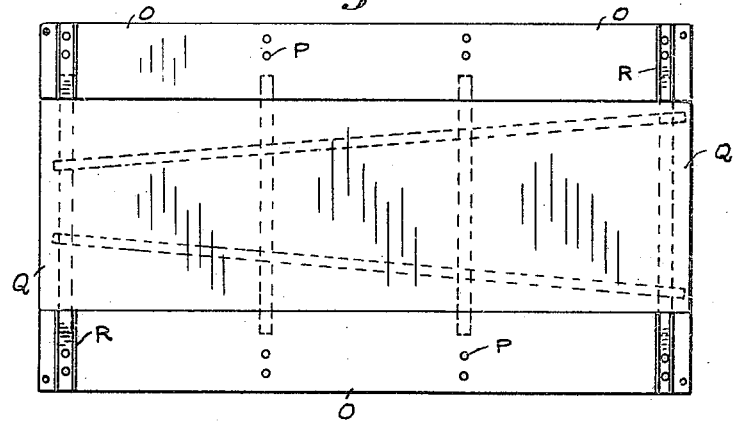
Figure 4:
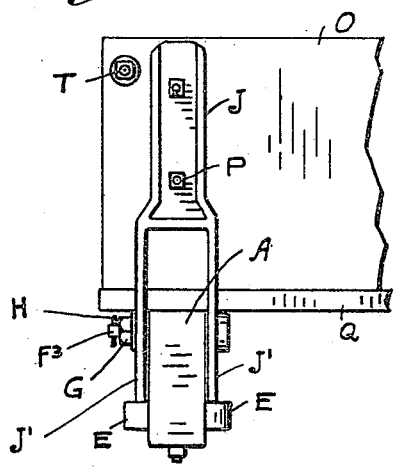
Figure 3:
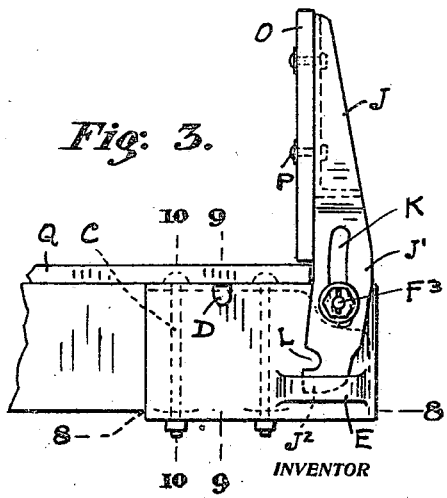
Figure 8:
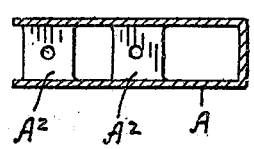

Figure 1 and Fig. 2 are plan views of a wagon body equipped with my invention, in the latter view the wagon body having been transformed into a platform bed. Fig. 3 is a side view, and Fig. 4 is an end view of my invention, the support arm being in the position occupied when the box form of wagon bed is formed. Fig. 5 is a side view, and Fig. 6 is a perspective view, showing the support arm in the position occupied when the platform style of wagon bed is formed, in the latter view the wooden parts of the wagon bed being not shown. Fig. 7 is a side view of a portion of the support arm showing the manner of securing the gate guide thereto. Fig. 8 is a transverse sectional view taken on the line 8—8 Fig. 3. Fig. 9 is a transverse sectional view taken on the line 9—9 Fig. 3, and Fig. 10 is a transverse sectional view taken on the line 10—10 Fig. 3. Fig. 11 is a detached detail view showing the bolt F and a portion of the base block A. Fig. 12 shows a modification of my invention.

The base block A of my invention is made of malleable iron or steel and is of the general conformation as shown most plainly in Fig. 6, the top portion $A^1$ and the side walls and end wall are of suitable thickness to be of substantial strength, and connecting the side walls at their bottom edges are the webs $A^2$. The function of the perforations B in the top portion $A^1$ and in the webs $A^2$, is the reception of the bolts C, as will be more fully referred to hereinafter. The opening $B^1$ is provided in the top portion $A^1$, so that the nails that are passed through the flooring may be driven into the sill that will fill the interior of the base block as will presently be referred to.

Formed integral with the side walls and near to their upper edges are the studs D.

E designates a lug provided upon the lower and outer portion of the side walls, so formed as to provide the recess $E^1$.

F designates a pin which is supported in a suitable bore $A^3$ therefore in the base block, there being sufficient stock provided for a solid bearing for said pin, as shown by the dotted line in Fig. 3. This pin has the shoulder $F^1$ and the shoulder $F^2$ and screwed down on the threaded shank $F^3$ is the flanged nut G.

H designates a cotter pin adapted to be passed through a perforation in the shank $F^3$ as shown in Fig. 11.

The support arm J is made of malleable iron or steel, the body portion being U shaped in cross section. The legs $J^1$ stand such distance apart as that they will engage with proper clearance, the opposite sides of the base block. In each of the legs $J^1$ is provided a cam slot K, and the recess L, and each of the said legs has the nose $J^2$.

My invention complete and in readiness to be placed in practical operative position, appears as shown in Fig. 6. It is very easily applied to use, it being necessary only to trim or shape the end of the sill of the wagon bed so that the base block may be slipped onto same. While it may be desirable that the end of the sill may extend into the base block completely to the end wall thereof, it is only necessary that the sill shall extend into the base block a distance sufficient that there may be passed through it both of the bolts C. Holes are bored through the sill to register with the holes B, the bolts C are then placed in position and when the nuts thereof are tightened, the base block is held rigidly in place on the end of the sill. It is obvious that my invention may be easily secured to sills of varied dimensions. The side-boards O of the wagon bed are then secured by the bolts P to the support arms and are so placed thereon, that when the floor-boards Q and the side boards O are in engagement, the nose J² will reside in the recess E¹, as shown in Fig. 3.

The shape of the cam slot K is such that when the support arm is in the erect position and the nose J² is seated in the recess E¹, the tendency of the weight of the support arm will be such that all of the parts will have proper bearing and will not rattle or become dislodged. If it may be desired to secure the legs J¹ rigidly against the sides of the base block the nut G is tightened. By the peculiar arrangement and form of this support arm the connection thereto of the side-boards is rendered very easy, as is also the connection thereto of the gate guide R. This gate guide R consists of a channel iron of suitable width and is connected to the side-boards and to the support arm in the manner as illustrated in Fig. 7. As shown in the box type of wagon bed illustrated in Fig. 1, the end gates S reside between the gate guides R, and the brace bolts T perform the usual function of bracing the structure.

To convert the box bed into a platform bed the end gates and brace bolts are removed, then by lifting the side-boards and pressing slightly inwardly, the nose J² leaves the recess E¹ and then the side-board may be let down and by pushing the lower side inwardly the support arms will glide easily along the cam slots K on the pin F and the recesses L will engage the studs D. The parts all will then occupy the position as shown in Fig. 2 and Fig. 5. The floor surface of the platform bed, will be continuous as shown, the advantage of which is obvious.

In Fig. 12 I have shown a modification wherein the nose J² is provided with a suitable aperture through which is passed the pin U, which pin also passes through a suitable aperture therefor in the base block. One end of this pin has an ordinary head, and the end shown in the drawing has a transverse perforation through which is passed the cotter V which is attached to the base block by a suitable chain. In this form of my invention the pin U will be removed when it is desired to shift the position of the support arm and reinserted and retained in its place, when not in the use as shown. If the protruding bolt heads or nuts are not objectionable, the bolts C may extend completely through the floor, as shown in Fig 12.

The objects of my invention are accomplished by the foregoing described construction, combination and arrangement of parts which I have considered preferable for carrying my invention into effect. It will be understood that minor changes might be made therein within the scope of my invention, as defined by the appended claim, without departing from the nature of my invention and without sacrificing any of its advantages.

What I claim as my invention and desire to secure by Letters Patent is—

In a wagon body, the combination of a sill, a hollow base block fastened thereto, a transversely disposed pin carried by said base block near its outer end, a recessed lug carried by the base block on either side thereof underneath the pin and a stud carried by the base block on either side thereof and near its upper edge, a support arm having perforations therein to receive fastening means for the side boards of the wagon body, the lower portion of the said support arm being bifurcated, the legs thereof being adapted to reside on either side of said base block, there being oppositely disposed curved slots in the said legs to engage said pin, and the lower ends of said legs being adapted to reside in the said recessed lugs when the arm is in the upright position and having a recess in their edges to engage the said studs when the support arm is in shifted position, all substantially as and for the purposes described.

In testimony whereof I sign my name to this specification in the presence of two subscribing witnesses.

JOHN W. A. BIRD.

Witnesses:
 THOMAS L. RYAN,
 ETHEL L. LISTER.